Nov. 17, 1942.   J. R. GOMERSALL   2,302,117
THERMAL TIMER
Filed March 14, 1942   3 Sheets-Sheet 1
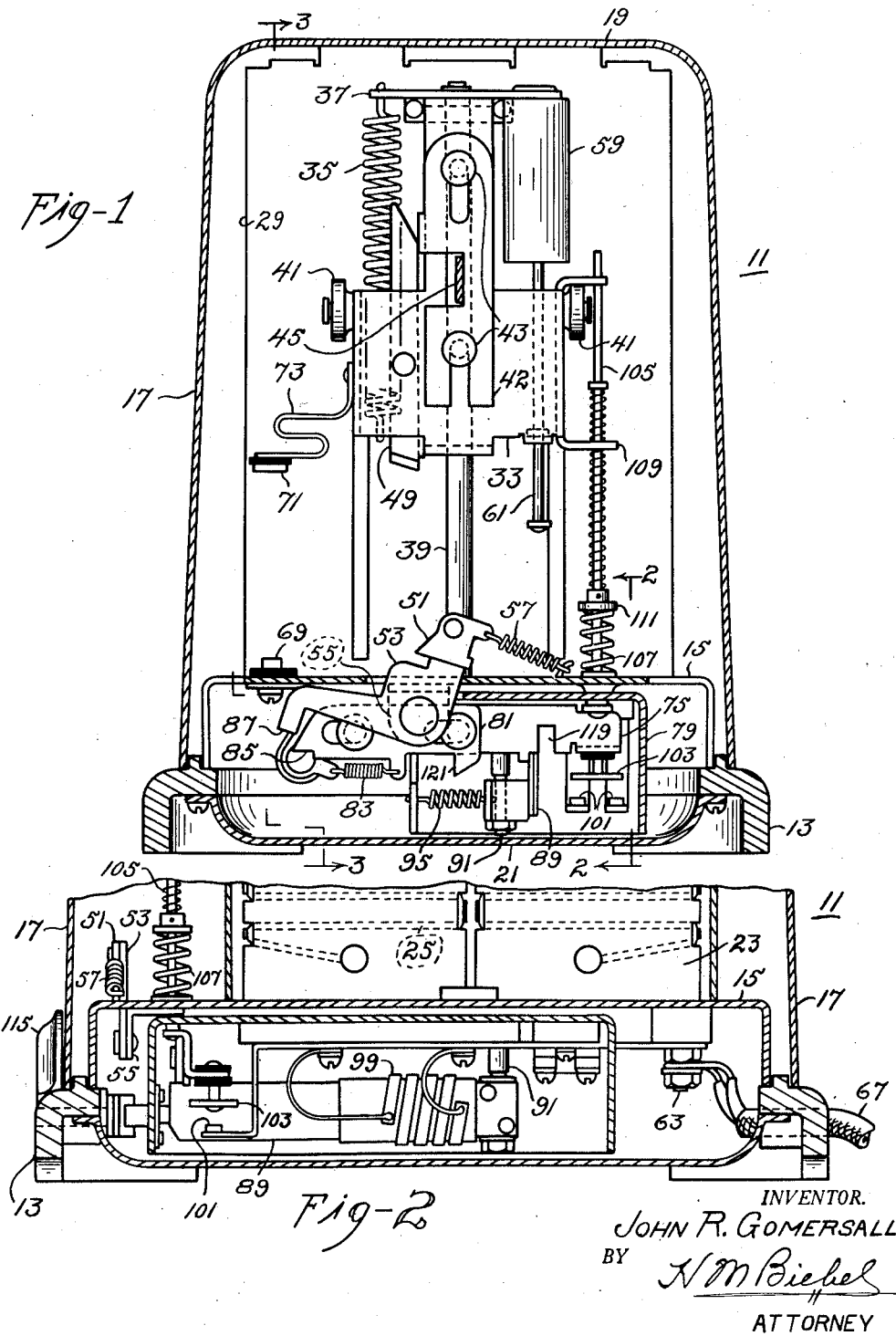
INVENTOR.
JOHN R. GOMERSALL
BY
ATTORNEY

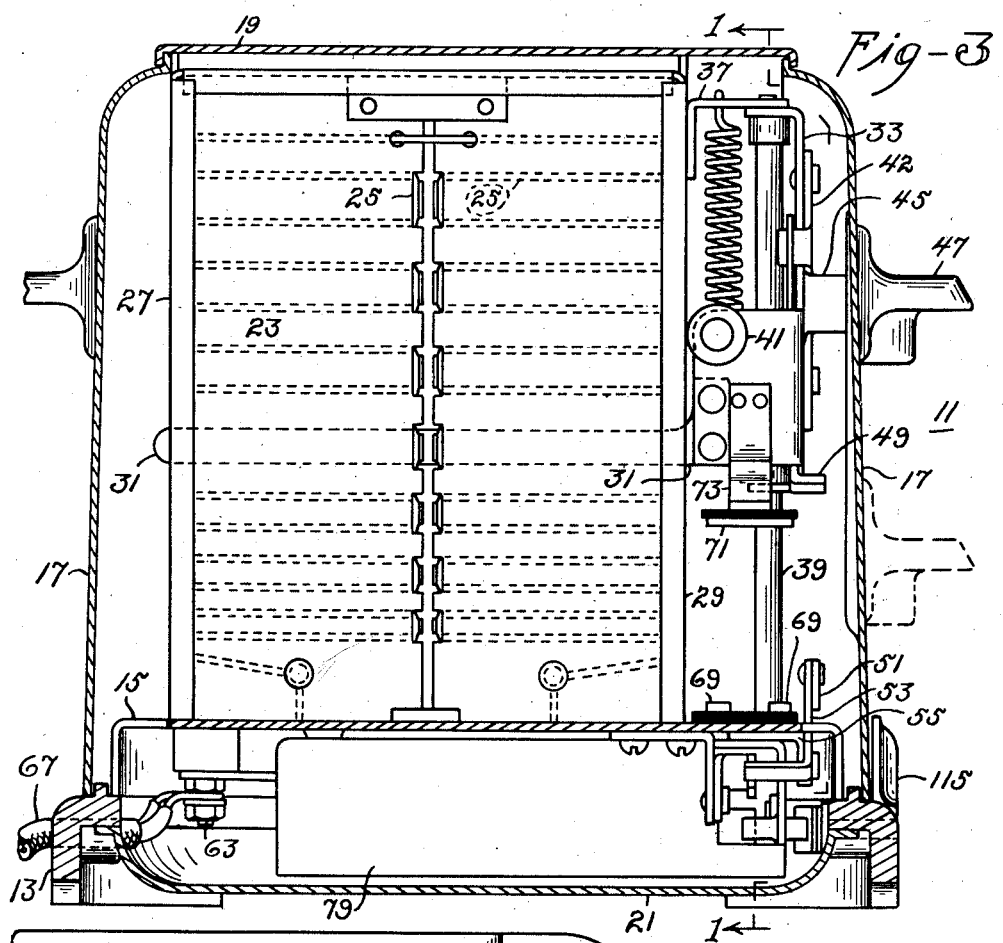
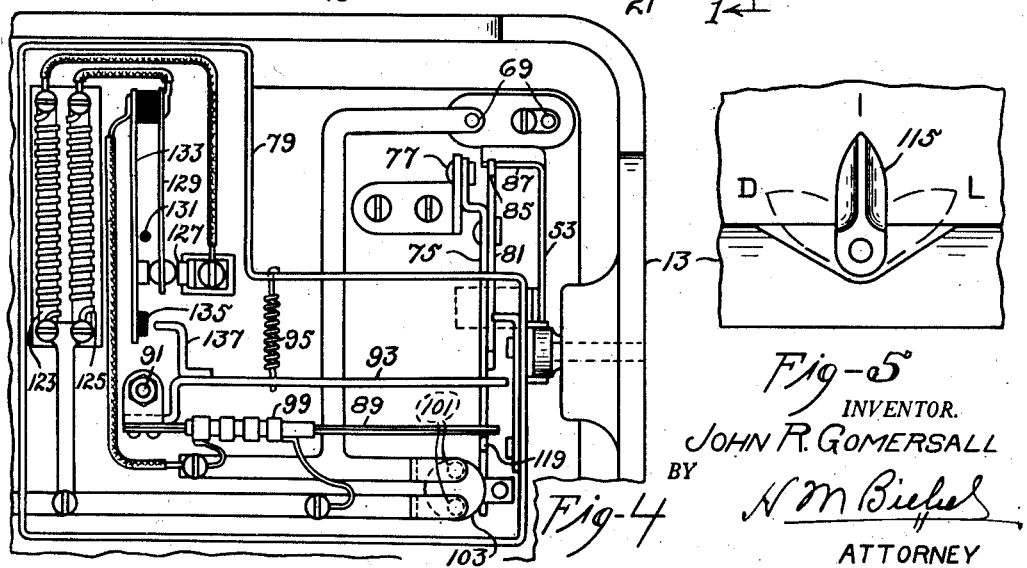

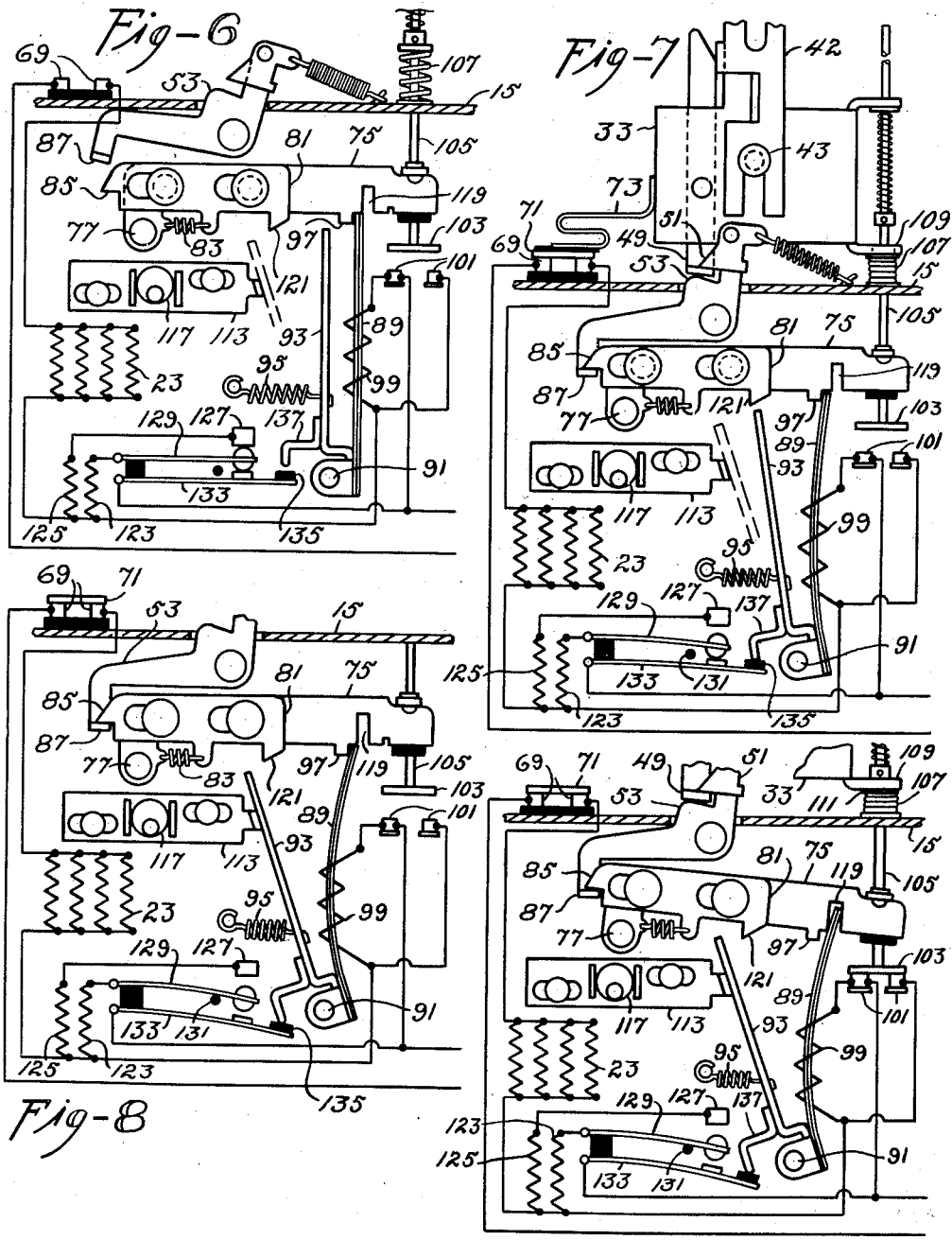

Patented Nov. 17, 1942

2,302,117

UNITED STATES PATENT OFFICE 2,302,117

THERMAL TIMER

John R. Gomersall, Elgin, Ill., assignor to Mc-Graw Electric Company, Elgin, Ill., a corporation of Delaware Application March 14, 1942, Serial No. 434,752

4 Claims. (Cl. 161—1)

My invention relates to timing mechanisms and more particularly to thermal timers.

An object of my invention is to provide relatively simple and highly effective means to ensure proper operation of a thermally actuable element constituting a part of a thermal timer.

Another object of my invention is to provide a relatively simple means to ensure continuity of the initial rate of change of a thermally actuable element with time.

Another object of my invention is to provide relatively simple means operatively associated with a thermal timer for causing an increase in the energizing current flowing through a heating element adapted to cause heating and consequent flexing of the bimetal element of the thermal timer.

Other objects of my invention will either be obvious from a description and the drawings comprising a part of this application or will be pointed out in the course of such description and set forth in the appended claims.

In the drawings,

Figure 1 is a vertical lateral section through a toaster having associated therewith the device embodying my invention, the section being taken on the line 1—1 of Fig. 3 and showing the parts in the normal or non-toasting positions, Fig. 2 is a fragmentary vertical longitudinal sectional view therethrough taken on the line 2—2 of Fig. 1, Fig. 3 is a vertical longitudinal sectional view taken on the line 3—3 of Fig. 1, the parts being shown in the same positions as in Fig. 1, Fig. 4 is a fragmentary plan view looking upwardly into the toaster, to show the positions of certain parts of the timer when the toaster is not operating, Fig. 5 is a fragmentary front view of a controlling means associated with the thermal timer, Fig. 6 is a fragmentary and generally diagrammatic view of the parts of the thermal timer in normal or non-toasting positions, Fig. 7 is a view similar to Fig. 6 except that the parts are shown in the positions occupied thereby just after the start of a toasting operation, Fig. 8 is a view similar to Fig. 7 except that the bimetal bar has flexed to a greater degree, and, Fig. 9 is a view similar to Fig. 8 except that the parts are shown in the positions they occupy when the bimetal bar has flexed to its maximum degree.

I have illustrated a toaster 11 to the extent that I consider necessary in order to disclose a fully operative toaster structure with which is associated a thermal timer of the kind disclosed in my issued Patent No. 2,266,024, to which timer the details embodying my present invention have been added.

The toaster structure 11 may include a moulded skeleton frame 13 of a kind now used in the art and a bottom plate 15, which may be of inverted dish shape, suitably secured to the upper surface of the skeleton frame 13. The toaster structure includes also a casing 17 comprising front, rear and side walls open at the top and the bottom and a top or cover member 19, all as now well known in the art. I provide also a removable crumb tray 21 which may be secured in any suitable or desired manner to the skeleton frame 13.

The toaster includes further a plurality of pairs of planar vertically-extending electric heating elements 23 which may each include one or more thin sheets of electric insulating material, such as mica, having wound thereon a heating resistor strand or wire 25, all in a manner now well known in the art. The toaster includes also a rear intermediate wall 27 and a front intermediate wall 29, the upper and lower ends of which may be supported in any suitable or desired manner so that they will remain in their desired and proper operative positions during toasting operations. The toaster includes also a bread carrier 31 located between each pair of vertical toast heating elements 23 and it is to be understood that the toaster may be designed for toasting either one slice of bread only at one time or a plurality of such slices.

The carrier or carriers 31 may be secured to a carriage plate 33 which is adapted to move vertically reciprocally from its upper non-toasting position shown in Figs. 1 and 3 to a lower toasting position. Means for yieldingly biasing the carriers 31 in their upper non-toasting position may include a tension coil spring 35, the lower end of which is connected to a convenient part of carriage plate 33 and the upper end of which is connected to a bracket 37, of substantially L-shape, secured to the front intermediate wall 29.

The carriage plate 33 is provided with upper and lower guide bushings or bearings adapted to move on a vertical standard 39 and the carriage plate may be provided with a plurality of rollers 41 adapted to lightly engage the front surface of intermediate wall 29 to prevent excess turning movement of the carriage plate on the vertical standard 39.

I provide further a secondary carriage plate 42 movable vertically relatively to the carriage plate 33 being held thereon by headed rivets 43. Member 42 has integral therewith a forwardly projecting portion 45 which is adapted to move in a suitable slot in the front wall of outer casing 17 and has mounted thereon an actuating knob 47 whereby an operator or user of the toaster may, by pressing downwardly on the knob, cause downward movement of the carrier and of the carriage portions 33 and 42 into toasting positions.

Carriage plate 33 has pivotally mounted thereon a latch lever arm 49 the lower forwardly-bent end portion thereof being adapted to engage under a hook member 51 pivotally mounted at the upper end of a detent 53 which is pivotally mounted on a suitable bracket 55 supported against the under surface of bottom plate 15. Detent member 53 is generally of L-shape and a biasing spring 57 connected with the upper portion of hook member 51 and with the bottom plate 15 normally yieldingly biases the detent and the hook member 51 into the position shown in Fig. 1 of the drawings which is substantially the normal or release position of these parts.

Means for reducing the upward speed of the bread carriers and the carriage 33 may include an air cylinder 59 having movable therein a piston mounted on the upper end of a piston rod 61 which is connected with carriage 33 by a lost-motion means well known in the art.

The toaster is further provided with terminals 63 for the heating elements and may have connected therewith a twin conductor cord 67. Means for controlling the energization of the heating elements 23 may include contact members 69 insulatedly mounted on the bottom plate 15 at its forward left-hand corner and these contact members may be engaged by a contact bridging member 71 insulatedly supported by a resilient bar 73 secured to the side portion of the carriage plate 33.

I have illustrated in the various drawings constituting a part of this application, the thermal timer which is disclosed and claimed in my issued Patent No. 2,266,024 assigned to the same assignee as is the present application and reference may be had to this patent for the details of this timer and its method of operation and only such reference to the various parts shown in the drawings in this application and their method of operation will be made as are considered necessary.

A lever arm 75 is pivotally supported on a pivot pin 77 which may be suitably supported as by a wall of a casing 79 in which the thermal timer may be positioned or in any other suitable or desired manner. Bar 75 has movably mounted thereon, longitudinally thereof, a latch bar 81 which may be held closely adjacent to one surface of the bar 75 as by headed pins and be normally yieldingly biased thereto into an operative position by a small coil tension spring 83. The left-hand end of latch bar 81 is provided with an angularly projecting portion 85 adapted to engage under a laterally projecting lug 87 on detent bar 53. When latch lever 49 is moved downwardly it will engage an intermediate portion of detent arm 53 and cause a limited degree of turning movement thereof in a counter-clockwise direction so that lug 87 may move into engagement with the nose 85 of bar 81 and then thereunder whereby the bread carriers will be held in toasting position for a length of time determined by means now to be described.

A bimetal bar 89 has one end thereof pivotally supported as by a pivot pin 91 and has mechanically rigidly secured thereto, at its pivoted end, a rigid bar 93, the main portion of which is spaced from the bar 89 and extends parallel thereto as long as the bimetal bar 89 is substantially straight. A coil spring 95 tends to normally yieldingly bias the bar 93 and the bimetal bar 89 in a counter-clockwise direction with the result that the free end of the bimetal bar 89 rests against a projecting portion 97 of arm or bar 75.

The bimetal bar 89 has insulatedly mounted thereon a small heating coil 99 which is normally connected in series circuit relation with the toast heating elements 23, all as now well known in the art.

The terminals of the heating coil 99 have connected therewith conductors leading to two fixed contact terminals 101 supported by any suitable means which contact terminals are adapted to be engaged under certain operating conditions by a contact bridging member 103. This contact bridging member is supported at the lower end of a vertically extending rod 105, which rod is normally yieldingly biased upwardly by a compression coil spring 107. When the carriage 33 is moved downwardly, a laterally projecting portion 109 thereon is moved downwardly into contact with a washer 111 on the bar 105, all as set forth in my earlier patent. Downward movement of the contact bridging member 103 and rod 105 is initially prevented by the bimetal bar 89 which extends in a plane substantially at right angles to the plane of the arm 75, as is shown correctly in Fig. 2 of the drawings, while Figs. 6, 7, 8 and 9 show these parts apparently in the same plane but this has been done for ease of illustration.

Let it be assumed that knob 47 has been moved downwardly to effect movement of the carrier and a slice of bread thereon into toasting position with the result that heating element 99 on the bimetal bar 89 is energized which will have the result shown more particularly in Fig. 7 of the drawings, namely that the bimetal bar 89 will flex to the shape shown in Fig. 7. The result of this will be that rigid bar 93 is turned toward the left and when bimetal bar 89 has flexed to a predetermined degree, this bar 93 will engage against an adjustable stop bar 113 suitably supported in the path of travel of rigid bar 93. Fig. 5 shows an adjusting means in the shape of a knob 115 at the front of the toaster which knob is adapted to move a cam disk 117 to thereby adjust the position of the end of stop bar 113 relatively to the rigid bar 93. When bar 93 is prevented from further turning movement in a counterclockwise direction, the flexing bimetal bar 89 will tend to move in a clockwise direction with the result that it will no longer engage lug 97 but move slightly away therefrom into a relatively deep recess 119 in bar 75 (see Fig. 9) whereby bar 75 may move slightly in a clockwise direction with the result that contact bridging member 103 on rod 105 may engage contact members 101 whereby the heating element 99 is short-circuited. This means that further heating of the bimetal bar and its flexing as a result thereof is stopped and the bimetal bar will now cool and flex in the opposite direction with the result that rigid bar 93 will be given a turning movement in a clockwise direction. At a certain position of rigid bar 83 it will engage a nose or lug 121 at the right-hand end of bar 81 whereby, upon further cooling of the bimetal bar 89, bar 81 is moved toward the right and out of interlocking engagement with lug 87 on the detent member 53 with the result that latch 49 on carriage 33 will be disengaged from the hook member 51 and will move upwardly quickly because of the action of the tension spring 35.

Toasters of this general kind are usually tested and adjusted to operate properly at some assumed standard voltage at the factory which circuit voltage may be 115 volts since the greater majority of supply circuits to which such toasters are usually connected in operation approximate this value. It is, however, possible that a toaster of this kind may be connected to a supply circuit the voltage of which is relatively very much lower, say 105 volts, or even 100 volts in the cases of circuits which are overloaded at certain times of the day or night. It is further possible that a toaster of this kind may be connected to circuits which are operating at excessively high voltage such as 120 or event 125 volts and it has been found difficult to so design, construct and adjust the heating element 99 on a given bimetal bar 89 that, in combination with the other parts of such a thermal timer, the degree of toasting desired, say medium, will be obtained at 100 volts, 115 volts and at 125 volts without any adjustment of knob 115.

It is, of course, necessary to provide such a length of operation of a toaster that it is possible to obtain dark toast on the relatively low voltage and this, of course, means that the length of such a toasting operation is relatively long, say on the order of three minutes or more, while the length of a toasting operation to obtain light toast on a high voltage may be on the order of a minute or even slightly less. It may be here pointed out that turning movement of adjusting member 115 will cause a shift in the position of bar 113 to the right or to the left and when bar 113 is moved to the right, as seen in Figs. 6 to 9 inclusive, the heating-up period of the heater 99 is less than it would be if the stop bar 113 had been moved toward the left.

I have found that when no additional means of control is provided on a toaster operating on the principle of first heating up a bimetal bar and then of permitting it to cool to a given temperature to determine the length of a toasting operation, it is almost impossible to maintain the rate of flexing of the bimetal bar at a constant value or a given length of time, this applying particularly to the final or last period of energization of the heater 99 since it is impossible in view of the hereinbefore described operating conditions to design and use a heating coil for the bimetal bar 89 of relatively high or increased wattage since this would tend to shorten the length of toasting period obtained by a thermal timer of this kind to too small a length of toasting operation when dark toast is to be obtained when the toaster is energized at say 100 volts.

I therefore provide a plurality of auxiliary resistors 123 and 125 suitably supported in the timer casing 79 and means actuated by the bimetal bar during its flexing incident to its being heated to increase the current in heating coil 99. For this purpose I provide a substantially fixed contact member 127 which is electrically connected to one terminal of resistor 125 and I provide a spring contact member 129 normally yieldingly biased against a stop member 131 and out of engagement with contact member 127. This spring contact arm 129 is connected to one terminal of resistor 123 and the other terminals of the two resistors are connected by suitable conductor to one terminal of the heating element 99. I provide further a second spring contact arm 133 which is normally biased into engagement with the contact member on contact arm 129 in a manner shown more particularly in Fig. 6 of the drawings. Arm 133 is connected to the other terminal of heating element 99 as will be noted by reference to Figs. 6 to 9 of the drawings.

Arm 133 has mounted thereon a small lug 135 at its free end which lug is adapted to be engaged by a member 137 which may be of substantially Z-shape and which is secured to rigid arm 83 at or near its pivoted end.

Referring first to Fig. 6 of the drawings it will be noted that member 137 is initially out of engagement with insulating lug 135 as long as the bimetal bar 89 is at room temperature as will be the case when the toaster is not in operation or for a short period of time after the start of a toasting operation.

Referring now to Fig. 7 of the drawings, it will be noted that the degree of flexure of bimetal bar 89 is such that actuating member 137 has been moved into engagement with lug 135 on arm 133 and that arm 133 has been moved against its bias to a degree sufficient to permit contact arm 129 to move, under its own bias, out of engagement with fixed contact member 127 with the result that resistor 125 is no longer connected in shunt circuit relation relatively to electric heater 99. This will have the result that the current traversing heater 99 is increased to a desired degree.

Referring now to Fig. 8 of the drawings, it will be noted that flexure of bimetal bar 89 has increased to such an extent that spring contact arm 133 has been moved out of engagement with contact arm 129 with the result that resistor 123 has also been disconnected from its original or initial shunt position relatively to heater 99 so that a further increase in the current traversing heater 99 is effected.

As has already been referred to, it is obvious that the heat radiated from the heater 99 and the bimetal bar may become so great, at higher temperatures of the heater and of the bimetal bar, that relatively little if any increase in temperature of the bimetal bar can be effected with the result that the desired continuous flexure of the bimetal bar necessary to properly operate the timer will not be effected. However, by increasing the current in the manner just above described, by disconnecting shunting resistors from the circuit of the heating element 99, it is possible to ensure vigorous continued flexure of the bimetal bar so that it is possible to obtain the required strength or power because of the flexure of the bimetal bar necessary to cause the hereinbefore described turning operation in a clockwise direction of the bimetal bar 89 and the resultant turning movement of bar 75 to thereby cause short-circuiting of the heater 99.

The device particularly embodying my invention and including the auxiliary resistors thus provides efficient and relatively simple means actuable by the bimetal bar itself through suitable means operatively associated therewith to obtain the desired result, namely continued flexure of the bimetal bar at a uniform rate per unit of time even at the higher temperatures of the timer parts involved particularly in determining the length of time of a toasting operation.

Various modifications may be made in the structures embodying my invention without departing from the spirit thereof and all such modifications clearly coming within the scope of the appended claims are to be considered as being covered thereby.

I claim as my invention:

1. In a thermal timer for measuring a time interval comprising a bimetal bar and an electric heating element therefor adapted to be energized to cause heating of the bimetal bar and flexing thereof in one direction and then to be deenergized to cause cooling of the bimetal bar and flexing thereof in the opposite direction, the improvement comprising a resistor connected in electric circuit with said electric heating element and switching means actuable by said bimetal bar when being heated to cause deenergization of said resistor and an increase in the amount of current carried by the electric heating element as said heating progresses.

2. In a thermal timer for measuring a time interval comprising a bimetal bar and an electric heating element therefor adapted to be energized to cause heating of the bimetal bar and flexing thereof in one direction and then to be deenergized to cause cooling of the bimetal bar and flexing thereof in the opposite direction, the improvement comprising a plurality of resistors, plural contact switching means, electric connections between the electric heating element, the plurality of resistors and the switching means and means actuable by said bimetal bar when flexing while being heated to cause an increase in the amount of current carried by the electric heating element as said heating progresses.

3. In a thermal timer for measuring a time interval comprising a bimetal bar and an electric heating element therefor adapted to be energized to cause heating of the bimetal bar and flexing thereof in one direction and then to be deenergized to cause cooling of the bimetal bar and flexing thereof in the opposite direction, the improvement comprising a plurality of resistors normally connected in shunt circuit with said electric heating element and switching means for said resistors actuable by said bimetal bar when being heated to cause sequential disconnection of said resistors and an increase in the amount of electric current carried by said electric heating element as the heating of said bimetal bar progresses.

4. In a thermal timer for measuring a time interval comprising a bimetal bar and an electric heating element therefor adapted to be energized to cause heating of the bimetal bar and flexing thereof in one direction and then to be deenergized to cause cooling of the bimetal bar and flexing thereof in the opposite direction, the improvement comprising a resistor connected in electric circuit with said electric heating element and switching means actuable by said bimetal bar when being heated to cause deenergization of said resistor and to maintain the degree of flexing of said bimetal bar per unit of time substantially constant during the heating period.

JOHN R. GOMERSALL.